United States Patent [19]

Smith

[11] Patent Number: 4,901,986
[45] Date of Patent: Feb. 20, 1990

[54] AIR BLADDER CONTROLLED HYDRAULIC ENGINE MOUNT

[75] Inventor: Stanley E. Smith, Dayton, Ohio

[73] Assignee: General Motors Corporation, Detroit, Mich.

[21] Appl. No.: 298,717

[22] Filed: Jan. 19, 1989

Related U.S. Application Data

[63] Continuation-in-part of Ser. No. 165,158, Mar. 7, 1988, abandoned.

[51] Int. Cl.⁴ .............................................. F16F 9/50
[52] U.S. Cl. ................................ 267/140.1; 248/566; 248/562; 248/636; 248/550; 267/219; 267/64.28
[58] Field of Search ............................... 267/217–220, 267/35, 64.11–64.28, 121–123, 140.1, 141.2–141.7, 152, 153; 248/550, 562, 636, 638, 566, 575; 180/300, 312, 902; 280/707, 711, 714; 188/299, 298, 322.21; 123/192 R, 192 B, 195 R

[56] References Cited

U.S. PATENT DOCUMENTS

| | | | |
|---|---|---|---|
| 4,415,148 | 11/1983 | Mair et al. .............................. | 267/122 |
| 4,588,173 | 5/1986 | Gold et al. ........................ | 267/219 X |
| 4,613,118 | 9/1986 | Morita ................................ | 167/140.1 |
| 4,638,983 | 1/1987 | Idigkeit et al. ..................... | 267/140.1 |
| 4,648,576 | 3/1987 | Matsui ............................ | 267/140.1 X |
| 4,650,169 | 3/1987 | Eberhard et al. ............ | 267/140.1 A |
| 4,650,170 | 3/1987 | Fukushima ........................ | 267/140.1 |
| 4,666,016 | 5/1987 | Abe et al. ...................... | 267/64.28 X |
| 4,693,455 | 9/1987 | Andra ................................. | 267/140.1 |
| 4,700,933 | 10/1987 | Chikamori et al. ............... | 267/140.1 |
| 4,709,779 | 12/1987 | Takehara ....................... | 267/140.1 X |
| 4,712,777 | 12/1987 | Miller ................................. | 267/140.1 |
| 4,720,084 | 1/1988 | Hollerweger et al. ......... | 267/140.1 X |
| 4,730,584 | 3/1988 | Jordens et al. ................. | 267/140.1 X |
| 4,742,998 | 5/1988 | Schubert ......................... | 267/35 X |
| 4,756,513 | 7/1988 | Carlson et al. ..................... | 267/140.1 |
| 4,828,234 | 5/1989 | Hoying et al. ................... | 248/550 X |
| 4,840,358 | 6/1989 | Hoying et al. .................... | 267/140.1 |

FOREIGN PATENT DOCUMENTS

| | | | |
|---|---|---|---|
| 0077195 | 4/1983 | European Pat. Off. ......... | 267/140.1 |
| 3447746 | 7/1986 | Fed. Rep. of Germany . | |
| 0222635 | 12/1984 | Japan ................................ | 267/140.1 |
| 0098237 | 6/1985 | Japan ................................ | 267/140.1 |
| 0119832 | 6/1986 | Japan ................................ | 267/140.1 |
| 0233237 | 10/1986 | Japan ................................. | 267/219 |
| 0278639 | 12/1986 | Japan ................................. | 267/219 |

Primary Examiner—Douglas C. Butler
Attorney, Agent, or Firm—Ronald L. Phillips

[57] ABSTRACT

A hydraulic mount assembly is disclosed having a partition forming two hydraulic chambers and including a damping decoupler. A primary chamber is formed by an elastomeric member and a secondary chamber by a resilient diaphragm. During dynamic loading of the mount, fluid passes through an orifice between the two chambers of the mount causing expansion and contraction of the diaphragm. An expandable, pneumatic bladder is mounted within the primary chamber. A tube provides fluid communication between the bladder and the atmosphere. When a valve in this tube is open, air freely enters and escapes the bladder in symphony with the vibrating mount. Alternatively, the valve may be closed and a positive pressure provided to the bladder from a variable pressure fluid supply. By actively controlling bladder expansion and contraction in this manner, the dynamic rate of the mount assembly may be selectively reduced at relatively high vibration frequencies; that is, those over 20 Hz. Damping may also be reduced to provide a relatively soft mount for engine isolation. Further, by evacuating the bladder, a relatively hard mount may be provided exhibiting relatively high damping and high rate for better engine control. A control circuit with on-board transducers is also provided to monitor vehicle operating and road conditions and modulate the pressure in the bladder for maximum operating efficiency.

3 Claims, 3 Drawing Sheets

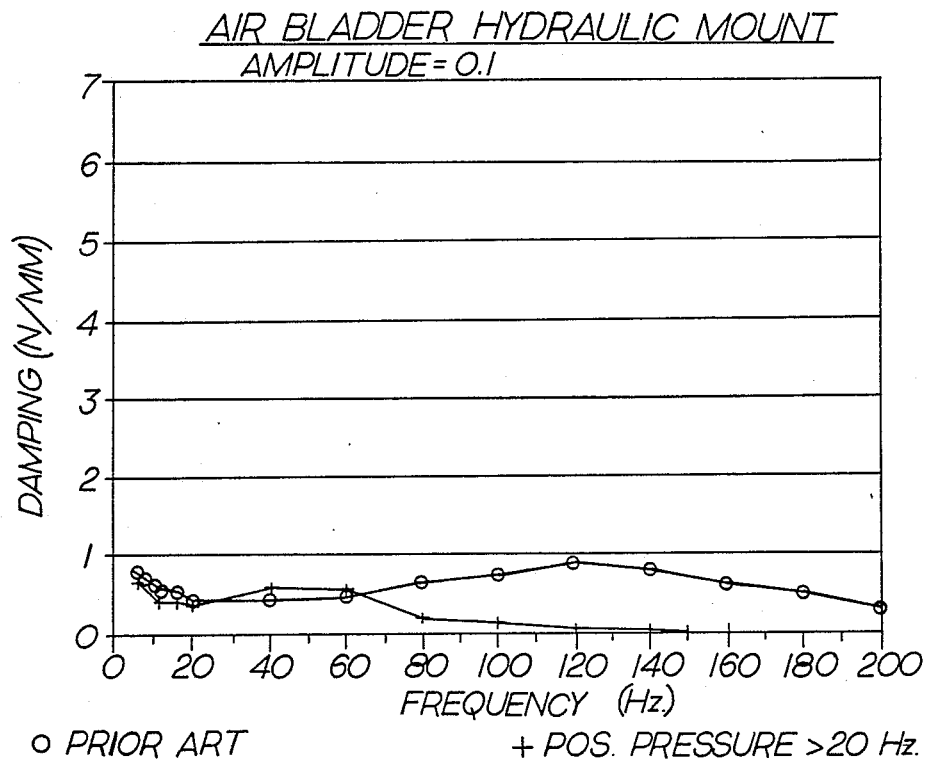
FIG. 4
FIG. 4A
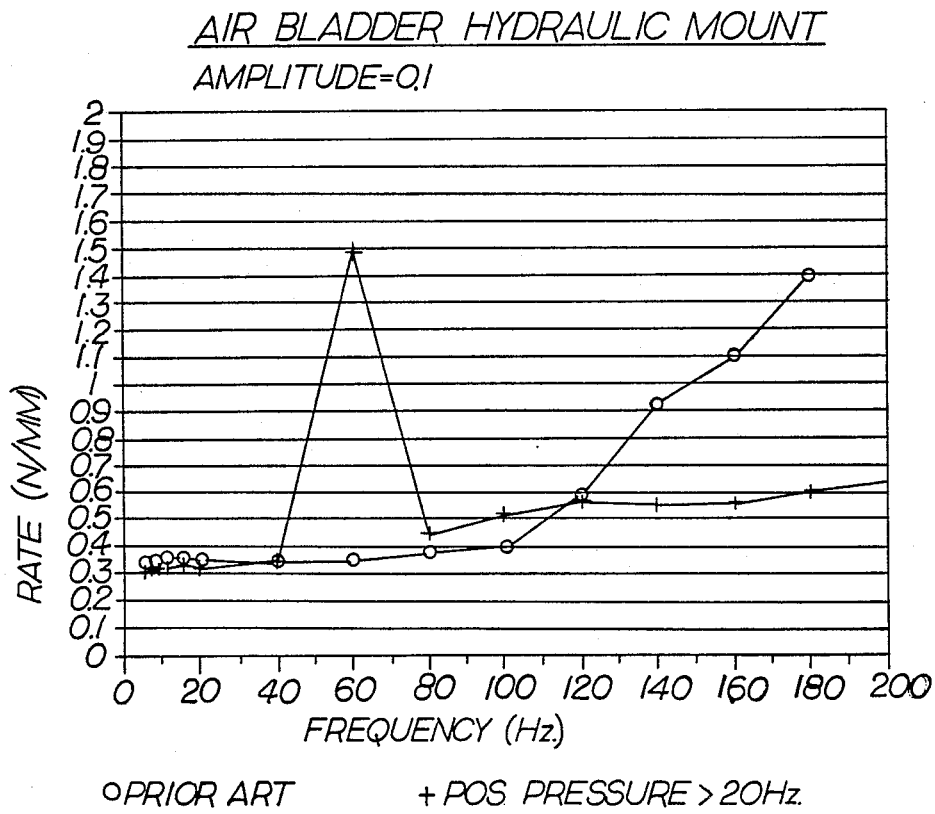

4,901,986

AIR BLADDER CONTROLLED HYDRAULIC ENGINE MOUNT

This is a continuation-in-part of U.S. Patent Application Ser. No. 165,158 filed Mar. 7, 1988, now abandoned.

TECHNICAL FIELD

The present invention relates generally to hydraulic mounts for vibration damping and, more particularly, to a vehicle mounted hydraulic mount assembly containing an internal air bladder designed to provide variable dynamic rate and damping characteristics in response to vehicle operating conditions.

BACKGROUND OF THE INVENTION

A variety of mount assemblies are presently available to isolate vehicle vibrations, such as for automobile and truck engines and transmissions. One of the most popular mounts today is the hydraulicelastomeric mount of the type disclosed in U.S. Pat. No. 4,588,173 to Gold et al., issued May 13, 1986 and entitled "Hydraulic-Elastomeric Mount" (see FIG. 1, marked "Prior Art".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accommodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly a high level of damping force and smoothing action. The high inertia of the hydraulic fluid passing through the orifice track contributes to the relatively hard mount characteristic in this mode. As a third (intermediate) operational mode of the mount, medium amplitude inputs produce lower velocity fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Such a hydraulic mount is disclosed in U.S Pat. No. 4,756,513 Carlson et al. issued on July 12, 1988 and entitled "Variable Hydraulic-Elastomeric Mount Assembly", assigned to the assignee of the present invention. This invention represents an improvement over previous mounts in that it provides a variable damping levels in response to sensed vehicle operating conditions. This is accomplished by the use of an inflatable air bladder to selectively control the diaphragm movement from the secondary chamber side of the mount assembly. The inflation of the bladder is directed by an external control circuit and provides different levels of damping. This control circuit includes a series of vehicle mounted transducers communicating with a preprogrammed microprocessor. The transducers supply vehicle/component vibration information to the microprocessor which in turn directs the operation of the bladder. The orifice track sizes/lengths as well as the control circuit are designed to conform to each vehicle application.

It has also recently been suggested to provide additional damping control by regulating movement of the mount assembly by a compressible fluid (air) chamber on the primary chamber side. However, this concept, as illustrated in the German patent publication DE 3447746 A1, published July 7, 1986 (FIG. 5) generally provides only for increased stiffness, especially at high frequencies, since the air chamber is on the outside of the hydraulic chamber. That is, the German designed mount assembly cannot be controlled to allow compression and/or controlled release of the air as an alternative to damping movement of the hydraulic fluid.

While these recently developed mounts are an improvement over the mounts of the prior art, they are thus not without limitations. At higher frequencies (over 20 Hz) the mounts still exhibit relatively high levels of damping and high dynamic rate and thereby provide only relatively hard characteristics. This is due to the described structure of the mounts. At these higher frequencies, relatively large damping fluid flows exhibiting high inertia forces still occur between the hydraulic chambers. Many times during vehicle operation, these high damping levels and dynamic rates are more than desired, resulting in an undesirable hard feel. With the prior art mounts, these high levels are simply not adjustable downwardly in order to obtain less damping and more engine isolation, that is sometimes desirable. Furthermore, the lower dynamic rate and damping especially at the higher frequencies cannot be obtained by such conventional adjustment methods as changing orifice track sizes/lengths and/or decoupler shapes.

A need exists, therefore, for a hydraulic mount assembly providing variable damping levels during vehicle operation, including high frequency conditions. Such a mount would provide desirable operating characteristics throughout the entire range of vehicle operating conditions.

SUMMARY OF THE INVENTION

Accordingly, it is a primary object of the present invention to provide a hydraulic mount assembly overcoming the limitations and disadvantages of the prior art.

Another object of the present invention is to provide a hydraulic mount assembly that is actively tunable to provide variable damping characteristics so as to more efficiently and effectively isolate vibrations and suppress noise over the entire range of vehicle operating and road conditions.

Yet another object of the present invention is to provide a hydraulic mount that includes an internal pneumatic bladder in the primary chamber which can be inflated or deflated in response to vehicle vibrations thereby providing increased control of damping and dynamic rate and enhanced vehicle operating characteristics.

Still another object of the present invention is to provide a hydraulic mount including an internal pneumatic bladder which when inflated at higher vehicle operating frequencies reduces both damping and dynamic rate so as to provide a relatively soft mount for better engine isolation.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention includes a pair of mounting members connected to each other through a hollow elastomeric body. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm. The partition further includes a decoupler and a fluid passage or orifice track connecting the two chambers.

According to an important aspect of this invention, a pneumatic bladder is provided in the primary chamber of the mount. When inflated, this bladder serves to reduce not only the damping level but also the dynamic rate of the mount. The bladder can be actively inflated/deflated by an external pump, or passively through a restricted orifice defined by an adjustable valve in response to the pumping operation of the mount itself. Advantageously, by tuning the damping and, dynamic rate characteristics of the mount to sensed actual vehicle vibration and operating conditions, more efficient and effective vibration and noise suppression is possible. For example, the hydraulic mount may be actively tuned back and forth between a relatively "soft" condition of low damping and low rate for best engine isolation and a relatively "hard" condition of high damping and high rate for best engine control, as required for maximum performance-type driving.

In operation of the mount, vibration forces within the design amplitudes and frequencies of the mount produce alternate contraction/expansion of the hollow body and primary chamber. When the vibration is initiated, the liquid first causes reciprocation of the decoupler. Certain small vibratory amplitudes (less than 1mm) usually produced at high frequencies; for example, such as during smooth engine idling, are thus accommodated by the alternate increases and decreases in the chamber volumes resulting from decoupler reciprocation. As a result, significant fluid flow through the restricted passage or track between the chambers, and therefore damping is avoided.

In contrast, during large vibratory amplitudes, the decoupler ceases reciprocating and all damping fluid flow occurs between the primary and secondary chambers. This flow is through the orifice track in the partition. The resistance to flow of the hydraulic fluid and the fluid inertia provide the damping action.

Upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency.

In addition to the above basic structure, the mount assembly of the present invention includes the damping and dynamic rate reduction/tuning concept referred to above. More specifically, the pneumatic bladder operates to reduce the flow of hydraulic fluid between the two chambers, thereby reducing damping levels. In addition, at relatively high operating frequencies the dynamic rate of the mount may be reduced to provide improved engine isolation when desired. These higher frequencies are normally engine induced (rather than suspension induced) vibrations and are generally greater than 20 Hz.

During operation, as the chamber volumes cycle, internal pressures cycle accordingly. In the preferred embodiment, these pressures typically reach a maximum 20 to 30 pounds per square inch (psi). The bladder is in one mode of operation inflated to internal pressures less than the above pressures; that is, less than 20 psi. Since the bladder is filled with a compressible fluid (air in the preferred embodiment), some of the damping fluid compresses (or evacuates) the bladder and the rest travels through the orifice track back and forth to the secondary chamber. This happens because the compressed air in the bladder offers less resistance, and thus depending on the pressure, takes precedent over the normal hydraulic fluid movement. This results in less damping fluid flows between chambers providing lower damping and a softer mount.

In the passive damping mode, the bladder communicates directly with the atmosphere via the valved control orifice. By leaving the valves open a predetermined amount, the bladder inhales/exhales in synchronization with the alternating internal pressures of the mount, lowering damping and dynamic rate.

Alternately, the bladder can be actively filled to a positive pressure by an external pump. The pump as well as the valve is controlled by an external preprogrammed control circuit including vehicle mounted transducers to sense vehicle vibration. The bladder internal pressure can be modulated by the control circuit to vary the dampening and rate reduction in response to vehicle operating conditions. Additionally, the control circuit advantageously chooses and switches between modes of operation (active passive) best suiting the vehicle's current operating characteristics. This provides optimum damping and rate response.

In either operating mode, the overall damping characteristics of the mount are lessened at higher frequencies due mainly to lower velocity, smaller frictional forces in the fluid. These smaller frictional, as well as inertial forces correspondingly produce lesser fluid flows, advantageously resulting in reduced fluid friction and lower damping level. The damping/rate curve advantageously stays lower as the frequency increases so that the characteristic hard damping action is avoided when desired even at the highest vibration frequency levels.

The internal bladder pressure evacuates either by an external pump or by the pumping action of the fluid in the mount. This action assures the modulating effect is present as the fluid flows back from the secondary chamber to the primary chamber. Once the bladder is completely evacuated and held, the mount's high vibration, high damping rate is restored. Accordingly the mount may be actively and positively tuned to provide optimum damping and dynamic rate characteristics over all vehicle operating conditions.

Still other objects of the present invention will become apparent to those skilled in this art from the following description of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principals of the invention. In the drawing:

FIG. 4 is a graph illustrating the damping action of a representative hydraulic mount of the present invention shown against the damping action of the prior art mount over a full range of amplitudes;

FIG. 4A is a graph illustrating the dynamic rate of the same hydraulic mount of the present invention as illustrated in FIG. 4, and with a comparison to the dynamic rate of the prior art mount over the amplitude range;

DETAILED DESCRIPTION OF THE INVENTION

Figure 1:
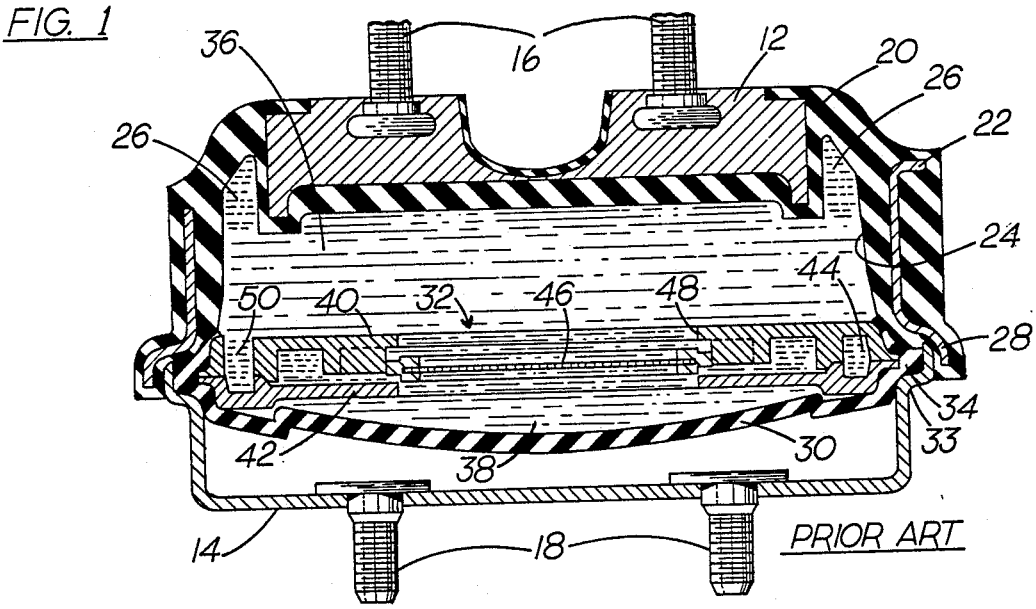
FIG. 1 is a cross-sectional view of a typical prior art hydraulic-elastomeric mount as identified above.
Figure 2:
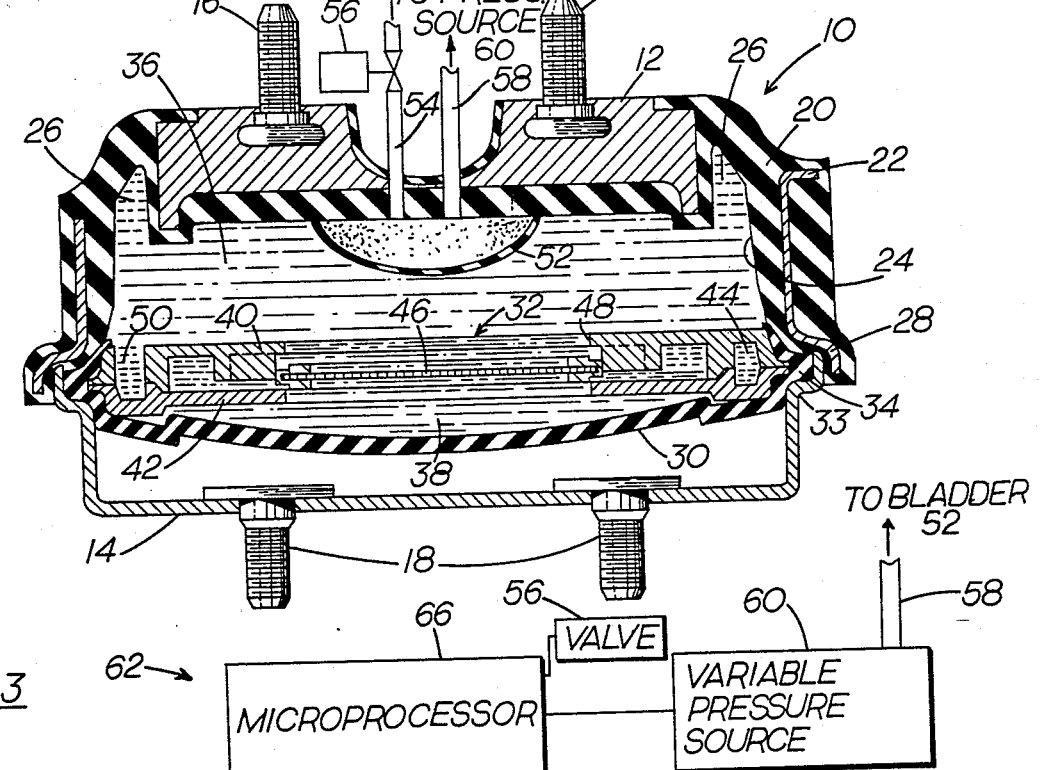
FIG. 2 is a cross-sectional view of one embodiment of the hydraulic mount of the present invention showing the flexible, pneumatic bladder mounted within the primary chamber of the mount.

Reference is now made to the drawing FIGS. 1 and 2 showing in contrast a prior art mount and the improved hydraulic-elastomeric mount assembly 10 of the present invention respectively. Both mounts are particularly adapted for mounting a component, such as an internal combustion engine in a vehicle. The dynamic characteristics of the mount assembly 10 of the present invention, however, may be actively adjusted or tuned to meet the specific application. As a result, the desired amplitude control, as well as the coefficient of damping and resulting dynamic rate best suited to isolate a particular vibration condition, can be obtained. The mount assembly 10 can of course be used in applications other than engine mounts, where controlled damping of vibration is desired especially with a reduced damping action at high frequencies.

The mount assembly of the prior art shown in FIG. 1 includes a cast metal mounting member 12 and stamped sheet metal mounting member 14. The mounting members 12 and 14 have a pair of mounting studs 16, 18, respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body 20 may be molded to and about the mounting member 12 and includes an embedded stamped sheet metal retainer 22.

The body 20 defines a hollow cavity 24 for receiving a damping liquid, such as commercial engine antifreeze/coolant. Oppositely located voids 26 are formed in the body between the mounting member 12 and the retainer 22. These voids 26 provide directional dynamic rate control within the elastomeric body 20 itself and form a part of the damping liquid cavity 24. As is known in the art, such voids 26 are especially useful in isolating certain internal combustion engine vibrations.

Together, the mounting member 12, elastomeric body 20 and metal retainer 22 form a first subassembly or cover of the mount assembly. The retainer 22 includes an outwardly projecting collar 28 at its lower periphery. The collar 28 is formed to receive a second subassembly or base. The base comprises the mounting member 14 and elastomeric diaphragm 30 of natural or synthetic rubber and a partition 32 with flow orifices.

The elastomeric diaphragm 30 includes an annular rim portion 34 having a peripheral groove formed between upper and lower shoulders respectively. The shoulders are flexible so as to receive the outer edge of the partition 32. Thus, the partition 32 is sealingly engaged by the shoulders on opposite sides of the groove.

The mounting member 14 is formed with a collar 33 to receive the rim portion 34 of the diaphragm 30. Collar 33 of member 14 fits within collar 28 of the retainer 22. As is known in the art, tabs (not shown) may be provided on the collar 28 and bent over to retain and seal the whole mount assembly.

The elastomeric diaphragm 30 closes the elastomeric body 20 so as to form therewith the closed damping cavity 24. This cavity 24 is divided by the partition 32 into a primary chamber 36 enclosed by the elastomeric body 20 and a secondary chamber 38 enclosed by the diaphragm 30.

The partition 32 is formed of non-magnetic material, and includes a pair of plates 40, 42 with matching peripheries. Plates 40, 42 span the cavity 24 and cooperate to define a damping orifice track 44 interconnecting the chambers 36, 38.

A decoupler 46 in the form of a rectangular plate formed of metal or plastic is positioned in a central opening 48 in the plates 40, 42. The decoupler 46 is mounted for limited up and down reciprocal movement in the partition 32. The respective upper and lower faces of the decoupler 46 are directly engaged by the damping liquid within the primary and secondary chambers 36, 38. As a result, the decoupler 46 provides reciprocating movement in response to minimum amplitude alternating pressure build-ups in the chambers 36, 38 acting on opposite faces of the decoupler. This reciprocating movement within the plates 40, 42 toward and away from the chambers 36, 38 produces a limited volume change in primary and secondary chambers that effects hydraulic decoupling.

The flow passage or orifice track 44 is provided in the partition 32 to provide a flow of damping fluid between the primary and secondary chambers 36, 38 respectively. As shown, orifice track 44 communicates between the two chambers via opening 50 in plate 40 and an orifice in plate 42 (now shown). The length of track 44 can be fine tuned to the particular resonance frequencies of the component being damped.

During smooth operation, such as during smooth engine idling, low amplitude high frequency vibrations are produced. The decoupler 46 reciprocates in response to these low amplitude vibrations and the mount provides very little damping effect.

As vibration amplitudes and frequencies increase, the decoupler reaches the limit of its travel. At this point, damping fluid flow is initiated and flow occurs along the orifice track 44. This hydraulic fluid flow provides the standard damping action that is generally increasing above the 20 hertz (Hz) level and then tapers off at the higher frequencies, as shown in FIG. 4. The damping rate in this typical prior art device continues to increase above the 120 Hz level, almost geometrically (see FIG. 4A.

Thus, the higher frequencies and amplitudes, regardless of the cause (simply rough idle or conversely maximum engine loading) this prior art engine mount provides high damping characteristics. However, at these frequencies and amplitudes, it is of course desirable to have the softer acting, more engine isolating mount mode for certain conditions, such as the rough engine idle condition. But as can be seen in the charts, the prior art mount cannot recognize or achieve this desired result. By its very nature, the same high level damping that is desired under extreme operating conditions for maximum engine control have to be tolerated under all circumstances.

In accordance with the present invention as shown in FIG. 2, to avoid the above undesirable results and provide the desired control with a reduction in damping and dynamic rate at the higher frequencies, a pneumatic bladder 52 is provided inside the primary chamber 36 of the mount assembly 10. By controlling the inflation, and deflation (such as by compression and/or evacuation), the high frequency damping rate of the mount is effectively reduced. During operation, when the bladder 52 is inflated (see FIG. 2), some of the increased internal hydraulic pressure in the primary chamber 36 is expended by compressing the air in the bladder 52. Since the air is relatively easy to compress as compared to the damping movement of the hydraulic fluid, less hydraulic fluid flow occurs through orifice track 44. On the return stroke, the bladder 52 is enlarged to its original size, thus reducing the amount of hydraulic fluid that must be returned from the secondary chamber 38, and again reducing the damping effect. As a result, the damping level in both directions is reduced.

Advantageously, this concept represents a significant improvement over the prior art mount. This is because the above reduction in damping levels at high frequency cannot be readily achieved by changing the physical structure (orifice size, decoupler shape) of the mount. Only by employing the concepts of the present invention can such an advantageous reduction be effected.

Figure 3:
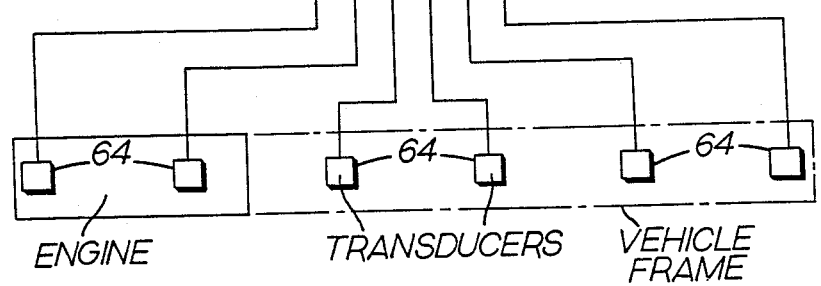
FIG. 3 is a schematic representation of the control circuit of the present invention.

To achieve the controlled pressurization of the pneumatic bladder 52, an air transfer tube 54 is provided and includes a valve 56 which allows air to enter or escape the bladder 52 when open. When desired, inflation line 58 directs air from variable pressure source 60 (see FIG. 3) to inflate the bladder 52 to a relatively low pressure, such as approximately 20 lbs/in$^2$ (where the hydraulic pressure in primary chamber is 21–30 lbs/in$^2$).

Variable pressure source 60 is controlled by a control circuit 62 which includes a plurality of vehicle mounted transducers 64 and a microprocessor 66. Control circuit 62 forms means for controlling the mount assembly 10 in response to sensed vehicle operating conditions and vibrations.

During active mode operation, the control circuit 62 responds to sensed vehicle vibrations by closing valve 56 and directing variable pressure source 60 to supply pressurized air to the bladder 52. The bladder is inflated to pressure lower than the primary chamber 36 internal pressure, as mentioned above. As a result of vibrations imposed on the mount assembly, the air in the bladder 52 is compressed by the hydraulic fluid in the primary chamber 36. Ultimately, less hydraulic fluid flows along orifice track 44, thereby providing a softer mount. It should be emphasized that the control circuit can be programmed to provide optimum pressure from the source 60 for variable modulation throughout the entire range of vehicle operating conditions.

Alternatively, the damping level can be passively reduced by opening valve 56 a controlled amount to thereby let bladder 52 communicate directly with the atmosphere. It can be seen that the pressure in the primary chamber 36 cycles from positive to negative during the mount operation. Accordingly, when the primary chamber 36 pressure is negative, the bladder 52 fills with air in a controlled fashion depending on the size of the orifice provided by the valve 56. When the pressure reverses and becomes positive the bladder 52 exhales air. This "breathing" action of the bladder thus passively results in less fluid flow across the orifice track, thereby resulting in a softer mount. Advantageously, the preprogrammed control circuit 62 chooses which mode of operation (active/passive) best suits the current operating conditions. This produces optimum damping and rate characteristics throughout the range of vehicle operating conditions.

During manufacture of the mount assembly 10, an appropriate level of prestress is applied to represent the design static load as the filling with hydraulic fluid takes place. Thus, when loaded in use and no vibration forces interposed, the bladder 52 is expanded and filled with air (see FIG. 2, neutral position) in readiness for inflation/deflation as necessary. Normally, the bladder 52 is formed integral with the elastomeric body 20, and has sufficient stiffness to assist in expansion to and holding of the neutral position. If necessary however, a spring (not shown) can be installed between the upper wall of the primary chamber and the inner surface of the bladder 52. This serves to assist the bladder in inflation.

The above described operation of the mount of the present invention is borne out by experimentation, as shown in FIGS. 4 and 4A. The damping and rate characteristics of the present invention are charted for comparison with the data of the earlier prior art mount. The data for the active operational mode, wherein positive pressure is supplied to the bladder, is depicted. As is clearly shown, the damping and dynamic rate at the higher frequencies is less than those of the earlier mount and is generally in a flattened curve. This provides the highly desirable reduction in damping characteristics resulting in optimum engine control versus engine isolating characteristics.

When maximum damping is desired to be retained in the high frequency range, the pressure source 60 is simply activated to evacuate the bladder 52. Under this condition, there is no compressible fluid in the primary chamber 36 and thus the mount assembly 10 is returned to the full damping mode, as depicted by the first set of curves described above.

Figure 5:
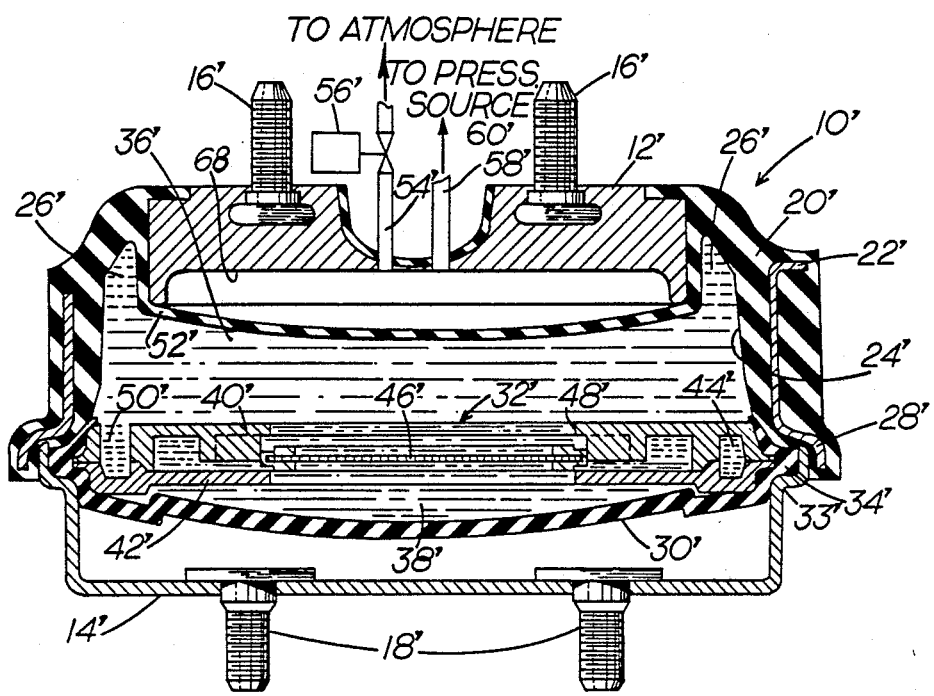
FIG. 5 is a view like FIG. 2 but of another embodiment of the hydraulic mount of the present invention.
Figure 6:
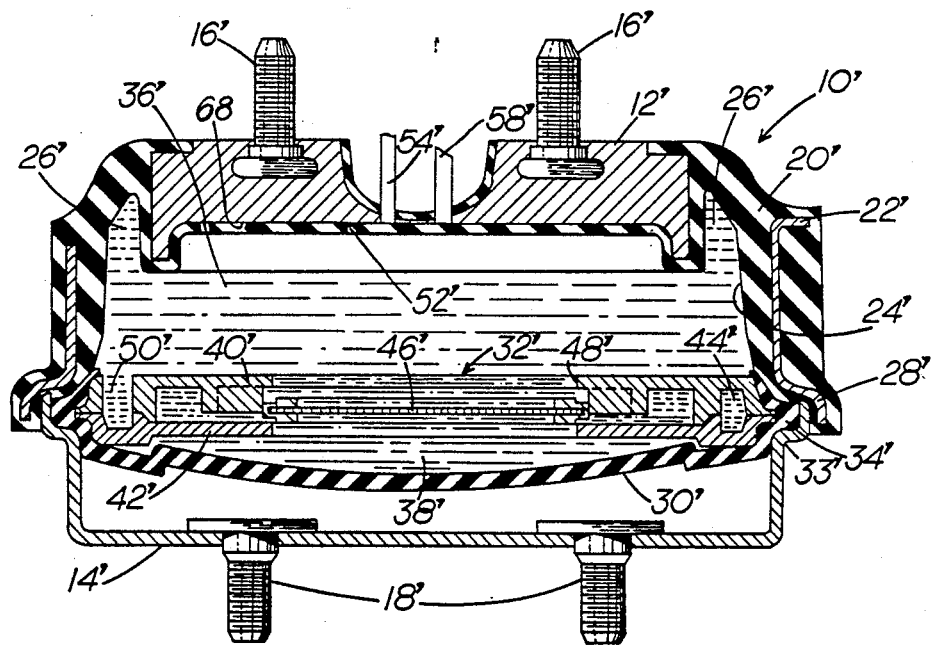
FIG. 6 is a view of the mount in FIG. 5 but with the bladder evacuated.

In the FIG. 2 embodiment, it will be observed that the bladder 52 does not span the entire upper end of the chamber 36 where same is acted on in a piston manner by the upper mounting member 12. It has been found that even better isolation is provided by effecting entire buffering of the entire piston surface of the upper mounting member as shown with the embodiment in FIGS. 5 and 6 wherein parts corresponding to those in the FIG. 2 embodiment are identified by the same numbers but primed and additional details are identified by new numbers. As seen in FIG. 5, the pneumatic bladder 52' is simply extended as compared with that in FIG. 2 so as to cover or be co-extensive with the acting piston surface 68 of the upper mounting member 12'. As a result, the piston surface 68 is effectively buffered from the fluid so that no fluid movement occurs through the orifice 44' when the bladder 52' deflates from its expanded condition shown in FIG. 5 to its deflated or evacuated condition shown in FIG. 6. With the upper mounting 12' thus effectively completely isolated from the fluid by the bladder 52', only the rubber body 20' and not damping fluid movement then occurs which has been found to produce vibration isolation significantly better or superior than that produced by the smaller bladder 52 in FIG. 2.

In summary, numerous benefits result from employing the concepts of the present invention. The hydraulic mount assembly employs a variable damping system including a pneumatic bladder in the primary chamber most preferably entirely buffering the associated mounting member and serving to adjust/reduce the damping characteristics of the mount especially at high frequencies. The bladder inflation/deflation can be actively controlled via use of control circuitry or passively by opening a valve and simply allowing the bladder to breathe in accordance with the cycling internal fluid pressures of the mount. Advantageously, a most desirable balance of engine control versus engine isolation can thus be provided at all times, throughout the entire range of vehicle operating conditions.

The foregoing description of the preferred embodiments of the invention have been presented for purposes of illustration and description. It is not intended to be exhaustive or to limit the invention to the precise form disclosed. Obvious modifications or variations are possible in light of the above teachings. For example, the control circuit 62 may include means for allowing the operator to tune the system response while in operation. In this way, the "feel" can be adjusted to suit the preference of each driver. The embodiments were chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. A hydraulic mount assembly for mounting an engine in a vehicle, comprising:
   a pair of mounting members;
   a hollow elastomeric body connected to said mounting members;
   an elastomeric diaphragm closing said hollow body and forming therewith a closed cavity that is filled with hydraulic fluid;
   means for partitioning said cavity into a primary chamber and a secondary chamber enclosed by said diaphragm;
   an orifice in said partitioning means connecting said chambers so as to effect damping;
   an expandable elastomeric bladder mounted within said primary chamber on one of said mounting members, said one mounting member having a piston surface at one side of said primary chamber, said bladder extending entirely across said piston surface so as to effectively buffer the entire piston surface and thereby isolate said one mounting member from the fluid in said primary chamber so that only elastomeric body stretching and not damping fluid movement occurs when said bladder deflates;
   communicates means for providing fluid communication between said bladder and the atmosphere;
   valve means for selectively opening and closing said communication means;
   variable pressure fluid supply means connected to said bladder to positively control the fluid pressure within said bladder;
   vehicle mounted transducer means for sensing vehicle operating conditions and resulting vibrations; and
   microprocessor means for selectively controlling said valve means and said variable pressure fluid supply means in response to signals from said transducer means whereby the damping and dynamic rate characteristics of said mount assembly may be tuned as desired especially for relatively high frequency vibrations.

2. The invention set forth in claim 1 wherein said bladder is integral with said elastomeric body.

3. The invention set forth in claim 1 wherein said transducers include both engine speed and vehicle vibration sensors.

* * * * *